(12) United States Patent
Gu et al.

(10) Patent No.: US 12,073,192 B2
(45) Date of Patent: Aug. 27, 2024

(54) FULL ADDER CIRCUIT AND MULTI-BIT FULL ADDER (71) Applicant: ZHEJIANG LAB, Zhejiang (CN)

(72) Inventors: Jiani Gu, Hangzhou (CN); Xiao Yu, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/488,991

(22) Filed: Oct. 17, 2023

(65) Prior Publication Data
US 2024/0078086 A1 Mar. 7, 2024

Related U.S. Application Data (63) Continuation-in-part of application No. PCT/CN2022/127525, filed on Oct. 26, 2022.

(30) Foreign Application Priority Data

Aug. 31, 2022 (CN) .......................... 202211053864.0

(51) Int. Cl.
G06F 7/503 (2006.01)
(52) U.S. Cl.
CPC .................................... G06F 7/503 (2013.01)
(58) Field of Classification Search
CPC ........ G06F 7/501; G06F 7/503; G06F 7/5016; G06F 2207/4816; G06F 2207/4818; H03K 19/0027; G06G 7/14
See application file for complete search history.

(56) References Cited

U.S. PATENT DOCUMENTS

| 4,602,170 | A | 7/1986 | Bertin |
| 10,073,733 | B1 | 9/2018 | Jain et al. |
| 2019/0065151 | A1 | 2/2019 | Chen et al. |
| 2020/0021290 | A1* | 1/2020 | Thapliyal ....... H03K 19/018521 |
| 2021/0279036 | A1 | 9/2021 | Li et al. |

(Continued)

FOREIGN PATENT DOCUMENTS

| CN | 103227635 A | 7/2013 |
| CN | 203119871 U | 8/2013 |

(Continued)

OTHER PUBLICATIONS

International Search Report (PCT/CN2022/127525); Date of Mailing: May 12, 2023.

(Continued)

Primary Examiner — Andrew Caldwell
Assistant Examiner — Carlo Waje
(74) Attorney, Agent, or Firm — W&G Law Group (57) ABSTRACT The present application discloses a full adder circuit and a multi-bit full adder. In the full adder circuit, an in-memory computing field-effect transistor stores data and performs logic operation on the data in the transistor and the loaded data according to different input signals; and a low-area full adder circuit is realized with very few transistors through the characteristics and the reading and writing modes of the in-memory computing field-effect transistor. The full adder circuit has a simple structure, which is greatly reduces the area and complexity of the full adder circuit, and saves 19 transistors compared with the traditional CMOS full adder circuits.

4 Claims, 2 Drawing Sheets

(56) References Cited

U.S. PATENT DOCUMENTS

| | | | |
|---|---|---|---|
| 2022/0157370 A1 | 5/2022 | Wheeler et al. | |
| 2022/0271756 A1 | 8/2022 | Fan et al. | |
| 2023/0223939 A1* | 7/2023 | Gu ..................... | H03K 19/21 |
| | | | 326/101 |

FOREIGN PATENT DOCUMENTS

| | | | |
|---|---|---|---|
| CN | 105720969 A | 6/2016 | |
| CN | 110427170 A | 11/2019 | |
| CN | 110597484 A | 12/2019 | |
| CN | 110995246 A | 4/2020 | |
| CN | 112002365 A | 11/2020 | |
| CN | 112118005 A | 12/2020 | |
| CN | 112636745 A | 4/2021 | |
| CN | 113593624 A | 11/2021 | |
| CN | 113805842 A | 12/2021 | |
| CN | 113889158 A | 1/2022 | |
| CN | 114024546 A | 2/2022 | |
| CN | 114093935 A | 2/2022 | |
| CN | 114974337 A | 8/2022 | |
| CN | 115113846 A | 9/2022 | |

OTHER PUBLICATIONS

First Office Action(CN202211053864.0); Date of Mailing: Oct. 17, 2022.
Notice of Allowance(CN202211053864.0); Date of Mailing: Oct. 25, 2022.

* cited by examiner

FULL ADDER CIRCUIT AND MULTI-BIT FULL ADDER

CROSS-REFERENCE TO RELATED APPLICATIONS

The present application is a continuation of International Application No. PCT/CN2022/127525, filed on Oct. 26, 2022, which claims priority to Chinese Application No. 202211053864.0, filed on Aug. 31, 2022, the contents of both of which are incorporated herein by reference in their entireties.

TECHNICAL FIELD

The present application belongs to the technical field of semiconductors and integrated circuits and in particular, to a full adder circuit and a multi-bit full adder.

BACKGROUND

In the traditional computing system based on a Von Neumann architecture, due to the physical separation of a computing unit and a storage unit, data needs to be frequently transferred between the two units, which leads to serious losses in system power consumption and speed. As a basic unit in electronic system, a full adder is widely used in large-scale integrated circuits. The full adder composed of traditional static CMOS requires 28 transistors, which not only has a slow circuit speed but also consumes a very large circuit area, and is very unfriendly to circuit performance and integration.

A nonvolatile in-memory computing field-effect transistor has the advantages of high speed, low power consumption, high integration density and non-destructive readout. By adjusting the polarization of the gate dielectric layer of the transistor, nonvolatile storage of data can be realized, which is helpful to accelerate the realization of the application of in-memory computing. The full adder circuit based on nonvolatile in-memory computing field-effect transistors has the characteristics of high speed, low power consumption and small area, which plays an important role in realizing a new computing architecture, improving the computing speed and energy efficiency, and increasing the circuit integration density.

SUMMARY

In view of the problems with the existing full adder circuit, the present application provides a full adder circuit and a multi-bit full adder, which reduces the circuit area and data handling power consumption by using the characteristics of nonvolatile in-memory computing field-effect transistors.

According to a first aspect of an embodiment of the present application, there is provided a low-area full adder circuit based on nonvolatile in-memory computing field-effect transistors; the low-area full adder circuit includes:

A sum generating circuit including six in-memory computing field-effect transistors, the sum generating circuit is used to receive a first input signal, a second input signal and a third input signal and output a first output signal.

A carry generating circuit coupled to the sum generating circuit and including three in-memory computing field-effect transistors, the carry generating circuit is used to receive the first input signal and the second input signal from the sum generating circuit, receive the third input signal, and output a second output signal.

The first output signal is a result of a summation logic operation of the first input signal, the second input signal and the third input signal, and the second output signal is a result of a carry logic operation of the first input signal, the second input signal and the third input signal.

Further, the sum generating circuit includes:

A first in-memory computing field-effect transistor, a threshold voltage of which is used to receive the first input signal and a gate voltage of which is used to receive the second input signal.

A first parallel structure including a second in-memory computing field-effect transistor and a third in-memory computing field-effect transistor; a threshold voltage of the second in-memory computing field-effect transistor is a constant value and a gate input signal thereof is a drain output signal of the first in-memory computing field-effect transistor; a threshold voltage of the third in-memory computing field-effect transistor is configured to receive the first input signal, and a gate voltage thereof is configured to receive the second input signal.

A seventh in-memory computing field-effect transistor, a threshold voltage of which is configured to receive the third input signal, and a gate input signal of which is a drain output signal of the first parallel structure.

A second parallel structure including an eighth in-memory computing field-effect transistor and a ninth in-memory computing field-effect transistor; a threshold voltage of the eighth in-memory computing field-effect transistor is a constant value, and a gate input signal thereof is a drain output signal of the seventh in-memory computing field-effect transistor; a threshold voltage of the ninth in-memory computing field-effect transistor is used to receive the third input signal, a gate input signal thereof is the same as that of the seventh in-memory computing field-effect transistor, and a drain output signal of the second parallel structure is the first output signal.

Further, the carry generating circuit includes:

A third parallel structure including a fourth in-memory computing field-effect transistor, a fifth in-memory computing field-effect transistor and a sixth in-memory computing field-effect transistor.

A threshold voltage of the fourth in-memory computing field-effect transistor is used to receive the third input signal, and a gate input signal thereof is a constant value.

A threshold voltage of the fifth in-memory computing field-effect transistor is used to receive the first input signal, and a gate voltage thereof is configured to receive the second input signal.

A threshold voltage of the sixth in-memory computing field-effect transistor is used to receive the first input signal, and a gate voltage thereof is configured to receive the second input signal.

A source output signal of the third parallel structure is the second output signal.

Further, the sum generating circuit includes:

The first in-memory computing field-effect transistor, a source terminal of which is grounded, and a drain terminal of which is connected to a pull-up resistor.

The first parallel structure including the second in-memory computing field-effect transistor and the third in-memory computing field-effect transistor; a drain terminal of the first parallel structure is connected to the pull-up resistor, a source terminal of the first parallel structure is connected to a small resistor, and the other end of the small resistor is grounded; a gate terminal of the second in-memory computing field-effect transistor is connected to the drain terminal of the first in-memory computing field-effect transistor.

The seventh in-memory computing field-effect transistor, a source terminal of which is grounded, a drain terminal of which is connected to the pull-up resistor, and a gate terminal of which is connected to the drain terminal of the first parallel structure.

The second parallel structure including the eighth in-memory computing field-effect transistor and the ninth in-memory computing field-effect transistor; a drain terminal of the second parallel structure is connected to the pull-up resistor, and a source terminal of the second parallel structure is grounded; a gate terminal of the eighth in-memory computing field-effect transistor is connected to a drain terminal of the seventh in-memory computing field-effect transistor.

Further, the carry generating circuit includes:

The third parallel structure including the fourth in-memory computing field-effect transistor, the fifth in-memory computing field-effect transistor and the sixth in-memory computing field-effect transistor.

A source terminal of the fourth in-memory computing field-effect transistor is connected to a drain terminal of the fifth in-memory computing field-effect transistor to form a first series structure.

A drain terminal of the fourth in-memory computing field-effect transistor is connected to a drain terminal of the sixth in-memory computing field-effect transistor, and a source terminal of the fifth in-memory computing field-effect transistor is connected to a source terminal of the sixth in-memory computing field-effect transistor, so that the first series structure is connected in parallel with the sixth in-memory computing field-effect transistor.

A gate terminal of the fifth in-memory computing field-effect transistor is connected to a gate terminal of the first in-memory computing field-effect transistor, and a gate terminal of the sixth in-memory computing field-effect transistor is connected to a gate terminal of the third in-memory computing field-effect transistor.

A source terminal of the third parallel structure is connected to the pull-down resistor, and a drain terminal of the third parallel structure is connected to $V_{dd}$.

Further, the sum generating circuit is configured to generate a sum signal and the carry generating circuit is configured to generate a carry signal.

Further, the in-memory computing field-effect transistor includes all field-effect transistors that can realize data storage and logical operations according to different control signals.

Further, the gate of the in-memory computing field-effect transistor is independent, and the threshold voltage thereof can be controlled by external physical fields; the in-memory computing field-effect transistor can store logic information by adjusting a threshold voltage $V_{th}$ and perform logic operation by applying different gate voltages $V_{in}$.

According to a second aspect of an embodiment of the present application, there is provided a multi-bit full adder formed by cascading a plurality of low-area full adder circuits based on nonvolatile in-memory computing field-effect transistors according to the first aspect.

The present application has the following beneficial effects:

The full adder circuit provided by the present application is constructed by nine nonvolatile in-memory computing field-effect transistors, and the computing speed and circuit integration are improved through the CIM (computing-in-memory) characteristics of the nonvolatile in-memory computing field-effect transistors, so that the full adder circuit can be realized by using fewer transistors on the basis of storing data in the nonvolatile in-memory computing field-effect transistors, thereby reducing the data transmission and circuit area, which plays an important role in improving the computing speed and integration density of the circuit.

In the drawings: 1—gate; 2—first gate dielectric layer; 3—second gate dielectric layer; 4—source; 5—drain; 6—substrate.

DESCRIPTION OF EMBODIMENTS

The technical solution in the embodiment of the present application will be clearly and completely described below with reference to the attached drawings. The described embodiments are only a part of many possible embodiments of the present application, but not all of the embodiments. They are intended to provide a basic understanding of the present application, and are not intended to confirm the key or decisive elements of the present application or limit the scope to be protected. It is easy to understand that according to the technical solution of the present application, without changing the essential spirit of the present application, other alternative implementations can be proposed by a general technical personnel in this field. Therefore, the following detailed description and drawings are only examples of the technical solution of the present application, and should not be construed as the whole of the present application or as limitations of the technical solution of the present application.

The present application provides a low-area full adder circuit based on nonvolatile in-memory computing field-effect transistors, which includes a sum generating circuit and a carry generating circuit; the sum generating circuit includes six in-memory computing field-effect transistors, and the sum generating circuit is used to receive a first input signal, a second input signal and a third input signal and output a first output signal; the carry generating circuit is coupled to the sum generating circuit and including three in-memory computing field-effect transistors, and the carry generating circuit is used to receive the first input signal and the second input signal from the sum generating circuit, receive the third input signal, and output a second output signal; the first output signal is the result of a summation logic operation of the first input signal, the second input signal and the third input signal, and the second output signal is the result of a carry logic operation of the first input signal, the second input signal and the third input signal.

According to the above embodiments, it can be seen that the full adder circuit provided by this present application is composed of nine nonvolatile in-memory computing field-effect transistors, which improves the circuit computing speed and circuit integration through the CIM characteristics of the nonvolatile in-memory computing field-effect transistors, and can realize the full adder circuit with fewer transistors on the basis of storing data in the nonvolatile in-memory computing field-effect transistors, thus reducing the data transmission and circuit area, which plays an important role in improving the circuit computing speed and integration density.

In an embodiment, the sum generating circuit includes a first in-memory computing field-effect transistor, a first parallel structure, a seventh in-memory computing field-effect transistor and a second parallel structure; a threshold voltage of the first in-memory computing field-effect transistor is used to receive the first input signal and a gate voltage of the first in-memory computing field-effect transistor is configured to receive the second input signal; the first parallel structure includes a second in-memory computing field-effect transistor and a third in-memory computing field-effect transistor; a threshold voltage of the second in-memory computing field-effect transistor is a constant value and a gate input signal thereof is a drain output signal of the first in-memory computing field-effect transistor; a threshold voltage of the third in-memory computing field-effect transistor is used to receive the first input signal, and a gate voltage thereof is configured to receive the second input signal; a threshold voltage of the seventh in-memory computing field-effect transistor is configured to receive the third input signal, and a gate input signal of the seventh in-memory computing field-effect transistor is a drain output signal of the first parallel structure; the second parallel structure includes an eighth in-memory computing field-effect transistor and a ninth in-memory computing field-effect transistor; a threshold voltage of the eighth in-memory computing field-effect transistor is a constant value, and a gate input signal thereof is a drain output signal of the seventh in-memory computing field-effect transistor; a threshold voltage of the ninth in-memory computing field-effect transistor is configured to receive the third input signal, a gate input signal thereof is the same as that of the seventh in-memory computing field-effect transistor, and a drain output signal of the second parallel structure is the first output signal.

In an embodiment, the carry generating circuit includes a third parallel structure; the third parallel structure includes a fourth in-memory computing field-effect transistor, a fifth in-memory computing field-effect transistor and a sixth in-memory computing field-effect transistor; a threshold voltage of the fourth in-memory computing field-effect transistor is used to receive the third input signal, and a gate input signal thereof is a constant value; a threshold voltage of the fifth in-memory computing field-effect transistor is configured to receive the first input signal, and a gate voltage thereof is used to receive the second input signal; a threshold voltage of the sixth in-memory computing field-effect transistor is used to receive the first input signal, and a gate voltage thereof is used to receive the second input signal; a source output signal of the third parallel structure is the second output signal.

In an embodiment, the sum generating circuit includes the first in-memory computing field-effect transistor, the first parallel structure, the seventh in-memory computing field-effect transistor and the second parallel structure; a source terminal of the first in-memory computing field-effect transistor is grounded, and a drain terminal of which is connected to a pull-up resistor; the first parallel structure includes the second in-memory computing field-effect transistor and the third in-memory computing field-effect transistor, a drain terminal of the first parallel structure is connected to the pull-up resistor, a source terminal is connected to a small resistor, and the other end of the small resistor is grounded; a gate terminal of the second in-memory computing field-effect transistor is connected to the drain terminal of the first in-memory computing field-effect transistor; a source terminal of the seventh in-memory computing field-effect transistor is grounded, a drain terminal of the seventh in-memory computing field-effect transistor is connected to the pull-up resistor, and a gate terminal of the seventh in-memory computing field-effect transistor is connected to the drain terminal of the first parallel structure; the second parallel structure includes the eighth in-memory computing field-effect transistor and the ninth in-memory computing field-effect transistor, a drain terminal of the second parallel structure is connected to the pull-up resistor, and a source terminal is grounded; a gate terminal of the eighth in-memory computing field-effect transistor is connected to a drain terminal of the seventh in-memory computing field-effect transistor.

In an embodiment, the carry generating circuit includes the third parallel structure; the third parallel structure includes the fourth in-memory computing field-effect transistor, the fifth in-memory computing field-effect transistor and the sixth in-memory computing field-effect transistor; a source terminal of the fourth in-memory computing field-effect transistor is connected to a drain terminal of the fifth in-memory computing field-effect transistor to form a first series structure; a drain terminal of the fourth in-memory computing field-effect transistor is connected to a drain terminal of the sixth in-memory computing field-effect transistor, and a source terminal of the fifth in-memory computing field-effect transistor is connected to a source terminal of the sixth in-memory computing field-effect transistor, so that the first series structure is connected in parallel with the sixth in-memory computing field-effect transistor; a gate terminal of the fifth in-memory computing field-effect transistor is connected to a gate terminal of the first in-memory computing field-effect transistor, and a gate terminal of the sixth in-memory computing field-effect transistor is connected to a gate terminal of the third in-memory computing field-effect transistor; a source terminal of the third parallel structure is connected to the pull-down resistor, and a drain terminal of the third parallel structure is connected to $V_{dd}$.

In an embodiment, the sum generating circuit is used to generate a sum signal and the carry generating circuit is used to generate a carry signal.

Figure 1:
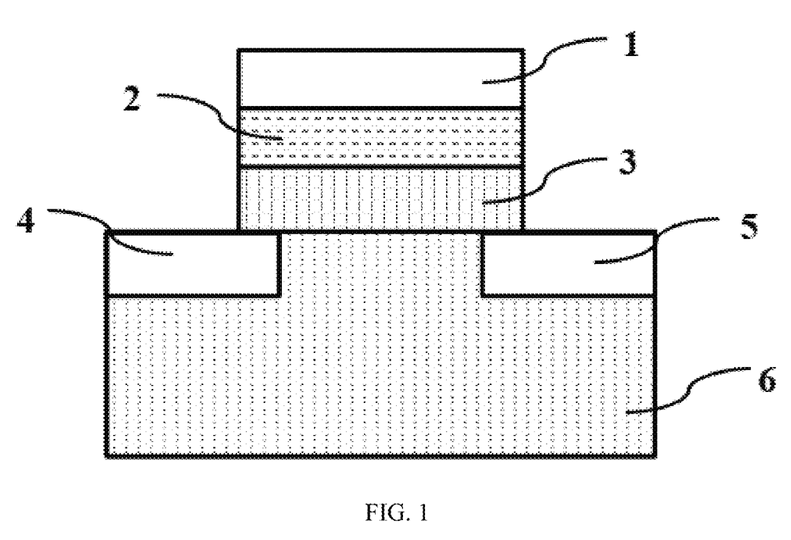
FIG. 1 is a schematic cross-sectional view of a nonvolatile in-memory computing field-effect transistor according to an embodiment of the present application.

In an embodiment, the in-memory computing field-effect transistor includes all field-effect transistors that can realize data storage and logical operations according to different control signals; the gate of the in-memory computing field-effect transistor is independent, and the threshold voltage thereof can be controlled by external physical fields; the in-memory computing field-effect transistor can store logic information by adjusting a threshold voltage $V_{th}$ and perform logic operation by applying different gate voltages $V_{in}$. Referring to FIG. 1, it is a schematic cross-sectional view of a nonvolatile in-memory computing field-effect transistor according to an embodiment of the present application, which is composed of a substrate 6, a source 4, a drain 5, a first gate dielectric layer 2, a second gate dielectric layer 3 and a gate 1. The first gate dielectric layer 2 is an insulating layer of High-K material (such as a ferroelectric material), and the threshold voltage $V_{th}$ of the transistor can be adjusted according to the polarization state of this layer; the second gate dielectric layer is a thin insulating layer (such as $SiO_2$) to prevent the diffusion and leakage of atoms; in this embodiment, firstly, the input of the first addend signal A is realized by adjusting the threshold voltage $V_{th}$ of the nonvolatile in-memory computing field-effect transistor, and then the input of the second addend signal B is realized by applying the gate voltage $V_{in}$; A and B are serial inputs; the change of threshold voltage $V_{th}$ of the nonvolatile in-memory computing field-effect transistor can realize the AND/OR relationship between A and B.

Figure 2:
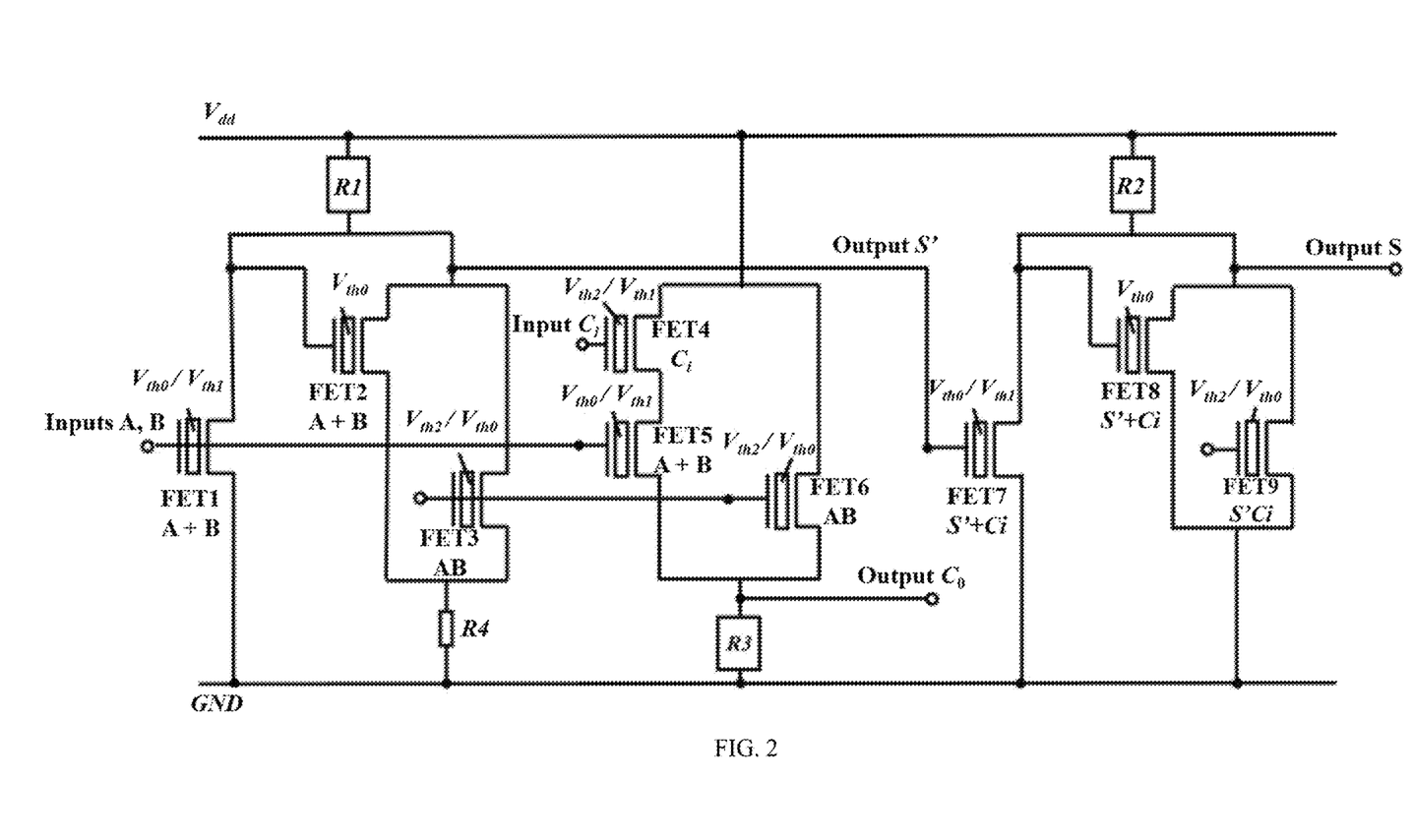
FIG. 2 is a circuit structure diagram of a low-area full adder based on nonvolatile in-memory computing field-effect transistors according to an embodiment of the present application.

Referring to FIG. 2, it is a structural diagram of a low-area full adder circuit based on nonvolatile in-memory computing field-effect transistors according to an embodiment of the present application. The full adder circuit includes a first in-memory computing field-effect transistor FET1, a second in-memory computing field-effect transistor FET2, a third in-memory computing field-effect transistor FET3, a fourth in-memory computing field-effect transistor FET4, and a fifth in-memory computing field-effect transistor FET5, a sixth in-memory computing field-effect transistor FET6, a seventh in-memory computing field-effect transistor FET7, an eighth in-memory computing field-effect transistor FET8 and a ninth in-memory computing field-effect transistor FET9; the sum generating circuit includes FET1, FET2, FET3, FET7, FET8 and FET9, and the carry generating circuit includes FET4, FET5 and FET6.

The gate of FET1 and FET5 are connected, and the gate of FET3 and FET6 are connected. The connected gate described above are the signal input ends of the full adder circuit, which are used to receive the first addend signal A and the second addend signal B; the gate of FET4 serves as a low-order carry signal input end of the full adder circuit, and the low-order carry signal input end is used for receiving a low-order carry signal $C_i$; the source of the parallel structure of FET2 and FET3 is connected to a small resistor $R_4$, and the voltage at both ends of the small resistor R4 is a low-level voltage $V_{R4}$; the gate input of FET7 and FET9 are the same, and their inputs are the drain output S' of the parallel structure of FET2 and FET3; FET4 and FET5 are connected in series and then connected in parallel with FET6, and the source signal output of this parallel structure is a high-order carry signal output $C_O$; the drain signal output of the parallel structure of FET8 and FET9 is a summation signal output S; using the characteristics of the nonvolatile in-memory computing field-effect transistor in FIG. 1, the logic information can be stored by modulating the threshold voltage $V_{th}$ of the transistor, and the logic operation can be performed by applying different gate voltages $V_{in}$, thus realizing the full-addition operation function.

The threshold voltage $V_{th}$ and the gate voltage $V_{in}$ of the nonvolatile in-memory computing field-effect transistor satisfy the following relationship: $V_{dd} > V_{th2} > V_{in2} > V_{th0} > V_{in1} > V_{R4} > V_{th1} > 0$, where the threshold voltage $V_{th}$ is modulated between $V_{th1}$, $V_{th0}$, $V_{th2}$, the gate voltage $V_{in}$ is modulated between $V_{in1}$ and $V_{in2}$, and the voltage difference $V_{dd} - V_{R1}/V_{R2}$ between $V_{dd}$ and the $V_{R1}/V_{R2}$ for resistor R1/R2 is greater than $V_{in2}$ and smaller than $V_{th2}$. The threshold voltages $V_{th}$ of FET1, FET2, FET3, FET5 and FET6 represent the input of the first addend signal A, and the gate voltages $V_{in}$ of FET1, FET2, FET3, FET5 and FET6 represent the input of the second addend signal B; the threshold voltages $V_{th}$ of FET4, FET7, FET8 and FET9 represent the input of the low-order carry signal $C_i$, and the gate voltages $V_{in}$ of FET4, FET7, FET8 and FET9 represent the input of a half-summation signal S'.

The specific implementation process is as follows:

1) The threshold voltages of FET1 and FET5 are modulated to $V_{th0}/V_{th1}$ to represent the input of the first addend signal A (the logic value of A is 0/1), and then a voltage $V_{in2}/V_{in1}$ is applied to the gate of FET1 and FET5 to represent the input of the second addend signal B (the logic value of B is I/O). According to the Karnaugh map of logic functions between A and B shown in Table 1, it can be deduced that FET1 and FET5 realize the logic output A+B.

TABLE 1

Karnaugh map of logical functions between A and B

| | | B | |
|---|---|---|---|
| | | 1 | 0 |
| A | | ($V_{in2}$) | ($V_{in1}$) |
| 0 | | 1 | 0 |
| ($V_{th0}$) | | ($V_{in2} > V_{th0}$) | ($V_{in1} < V_{th0}$) |
| 1 | | 1 | 1 |
| ($V_{th1}$) | | ($V_{in2} > V_{th1}$) | ($V_{in1} > V_{th1}$) |

* $V_{th2} > V_{in2} > V_{th0} > V_{in1} > V_{th1}$

2) The threshold voltages of FET3 and FET6 are modulated to $V_{th2}/V_{th0}$ to represent the input of the first addend signal A (the logic value of A is 0/1), and then a voltage $V_{in2}/V_{in}$ is applied to the gate of FET1 and FET5 to represent the input of the second addend signal B (the logic value of B is I/O). According to the Karnaugh map of logic functions between A and B shown in Table 2, it can be deduced that FET3 and FET6 realize the logic output AB.

TABLE 2

Karnaugh map of logical functions between A and B

| | | B | |
|---|---|---|---|
| | | 1 | 0 |
| A | | ($V_{in2}$) | ($V_{in1}$) |
| 0 | | 0 | 0 |
| ($V_{th2}$) | | ($V_{in2} < V_{th2}$) | ($V_{in1} < V_{th2}$) |
| 1 | | 1 | 0 |
| ($V_{th0}$) | | ($V_{in2} > V_{th0}$) | ($V_{in1} < V_{th0}$) |

* $V_{th2} > V_{in2} > V_{th0} > V_{in1} > V_{th1}$

3) When the threshold voltage of FET2 is fixed to $V_{th0}$, its logic output is only affected by the gate voltage; the gate input signal of FET2 is the drain output signal of FET1. Since the source of FET1 is grounded and the drain is connected to the pull-up resistor R1, the output of the drain end of FET1 realizes NOT gate (which is $\overline{A+B}$), the logic output of FET2 is: $\overline{A+B}$.

4) Since FET2 and FET3 are connected in parallel, the logical output of FET2 and FET3 implements OR gate operation, that is $\overline{A+B}+AB$; since the source end of the parallel structure of FET2 and FET3 is connected to the low-level voltage $V_{R4}$, and the drain end is connected to the pull-up resistor R1, the output of the drain end of the parallel structure realizes NOT gate (which is $\overline{\overline{(A+B)}+AB}$), the output of the drain end of the parallel structure is $S' = \overline{\overline{(A+B)}+AB} = A\overline{B} + \overline{A}B = A \oplus B$.

5) The threshold voltage of FET7 is modulated to $V_{th0}/V_{th1}$ to represents the input of the low-order carry signal $C_i$ (the logic value of $C_i$ is 0/1), and the gate input signal of FET7 is the output signal S' at the drain end of the parallel structure of FET2 and FET3. According to the Karnaugh map of logic functions between S' and $C_i$ shown in Table 3, it can be deduced that FET7 realizes the logic output $S' + C_i$.

TABLE 3

Karnaugh map of logical functions between S' and $C_i$

| $C_i$ | S' 1 ($V_{in2}$) | S' 0 ($V_{in1}$) |
|---|---|---|
| 0 ($V_{th0}$) | 1 ($V_{in2} > V_{th0}$) | 0 ($V_{in1} < V_{th0}$) |
| 1 ($V_{th1}$) | 1 ($V_{in2} > V_{th1}$) | 1 ($V_{in1} > V_{th1}$) |

* $V_{th2} > V_{in2} > V_{th0} > V_{in1} > V_{th1}$

6) When the threshold voltage of FET8 is fixed to $V_{th0}$, its logic output is only affected by the gate voltage; the gate input signal of FET8 is the drain output signal of FET7; since the source of FET7 is grounded and the drain is connected to the pull-up resistor R2, the output of the drain of FET7 realizes NOT gate, the logical output of FET8 is $\overline{S'+C_i}$.

7) The threshold voltage of FET9 is modulated to $V_{th2}$/$V_{th0}$ to represent the input of the low-order carry signal $C_i$ (the logic value of $C_i$ is 0/1), and the gate input signal of FET9 is the same as that of FET7, that is, S'. According to the Karnaugh map of logic functions between S' and $C_i$ shown in Table 4, it can be deduced that FET9 realizes the logic output S'$C_i$.

TABLE 4

Karnaugh map of logical functions between S' and $C_i$

| $C_i$ | S' 1 ($V_{in2}$) | S' 0 ($V_{in1}$) |
|---|---|---|
| 0 ($V_{th2}$) | 0 ($V_{in2} < V_{th2}$) | 0 ($V_{in1} < V_{th2}$) |

TABLE 4-continued

Karnaugh map of logical functions between S' and $C_i$

| $C_i$ | S' 1 ($V_{in2}$) | S' 0 ($V_{in1}$) |
|---|---|---|
| 1 ($V_{th0}$) | 1 ($V_{in2} > V_{th0}$) | 1 ($V_{in1} < V_{th0}$) |

* $V_{th2} > V_{in2} > V_{th0} > V_{in1} > V_{th1}$

8) Since FET8 and FET9 are connected in parallel, the logical outputs of FET8 and FET9 perform OR gate operation, that is $\overline{S'+C_i}$+S'$C_i$; since the source end of the parallel structure of FET8 and FET9 is grounded and the drain end is connected to the pull-up resistor R2, the output of the drain end of the parallel structure realizes NOT gate (which is $\overline{(\overline{S'+C_i})+S'C_i}$), the drain end of the parallel structure outputs S=$\overline{(\overline{S'+C_i})+S'C_i}$=S'$\overline{C_i}$+$\overline{S'}C_i$=S'⊕$C_i$; since S'=A⊕B, S=S'⊕$C_i$=A⊕B⊕$C_i$, the summation output of the full adder circuit is realized.

9) The threshold voltage of FET4 is modulated to $V_{th2}$/$V_{th1}$ to represents the input of the low-order carry signal $C_i$ (the logic value of $C_i$ is 0/1). when the gate voltage is fixed to $V_{in1}$, its logic output is only affected by the threshold voltage, that is, the logic output of FET4 is $C_i$; since FET4 and FET5 are connected in series and then connected in parallel with FET6, the logic output of FET4 and FET5 perform AND gate operation, and the obtained logic result performs OR gate operation with the logic output of FET6. The source of the parallel structure is connected to the pull-down resistor R3, and the output signal of the source end of the parallel structure is a high-order carry output $C_O$=(A+B)$C_i$+AB=A$C_i$+B$C_i$+AB, thus realizing the carry output of the full adder circuit.

The following table 5 is a voltage configuration table of the nonvolatile in-memory computing field-effect transistor for the low-area full adder circuit according to the embodiment of the present application. The full addition logic operation can be realized by modulating the threshold voltage $V_{th}$ and the gate voltage $V_{in}$ of the nonvolatile in-memory computing field-effect transistor in the circuit.

TABLE 5

Voltage configuration table of nonvolatile in-memory computing field-effect transistor for low-area full adder circuit

| | | | | | | | | | |
|---|---|---|---|---|---|---|---|---|---|
| FET1 | $V_{th}$ | $V_{th0}$ | $V_{th0}$ | $V_{th0}$ | $V_{th0}$ | $V_{th1}$ | $V_{th1}$ | $V_{th1}$ | $V_{th1}$ |
| | $V_{in}$ | $V_{in1}$ | $V_{in1}$ | $V_{in2}$ | $V_{in2}$ | $V_{in1}$ | $V_{in1}$ | $V_{in2}$ | $V_{in2}$ |
| FET2 | $V_{th}$ | $V_{th0}$ | $V_{th0}$ | $V_{th0}$ | $V_{th0}$ | $V_{th0}$ | $V_{th0}$ | $V_{th0}$ | $V_{th0}$ |
| | $V_{in}$ | $V_{dd}-V_{R1}$ | $V_{dd}-V_{R1}$ | 0 | 0 | 0 | 0 | 0 | 0 |
| FET3 | $V_{th}$ | $V_{th2}$ | $V_{th2}$ | $V_{th2}$ | $V_{th2}$ | $V_{th0}$ | $V_{th0}$ | $V_{th0}$ | $V_{th0}$ |
| | $V_{in}$ | $V_{in1}$ | $V_{in1}$ | $V_{in2}$ | $V_{in2}$ | $V_{in1}$ | $V_{in1}$ | $V_{in2}$ | $V_{in2}$ |
| FET4 | $V_{th}$ | $V_{th2}$ | $V_{th1}$ | $V_{th2}$ | $V_{th1}$ | $V_{th2}$ | $V_{th1}$ | $V_{th2}$ | $V_{th1}$ |
| | $V_{in}$ | $V_{in1}$ | $V_{in1}$ | $V_{in1}$ | $V_{in1}$ | $V_{in1}$ | $V_{in1}$ | $V_{in1}$ | $V_{in1}$ |
| FET5 | $V_{th}$ | $V_{th0}$ | $V_{th0}$ | $V_{th0}$ | $V_{th0}$ | $V_{th1}$ | $V_{th1}$ | $V_{th1}$ | $V_{th1}$ |
| | $V_{in}$ | $V_{in1}$ | $V_{in1}$ | $V_{in2}$ | $V_{in2}$ | $V_{in1}$ | $V_{in1}$ | $V_{in2}$ | $V_{in2}$ |
| FET6 | $V_{th}$ | $V_{th2}$ | $V_{th2}$ | $V_{th2}$ | $V_{th2}$ | $V_{th0}$ | $V_{th0}$ | $V_{th0}$ | $V_{th0}$ |
| | $V_{in}$ | $V_{in1}$ | $V_{in1}$ | $V_{in2}$ | $V_{in2}$ | $V_{in1}$ | $V_{in1}$ | $V_{in2}$ | $V_{in2}$ |
| FET7 | $V_{th}$ | $V_{th0}$ | $V_{th1}$ | $V_{th0}$ | $V_{th1}$ | $V_{th0}$ | $V_{th1}$ | $V_{th0}$ | $V_{th1}$ |
| | $V_{in}$ | $V_{R4}$ | $V_{R4}$ | $V_{dd}-V_{R1}$ | $V_{dd}-V_{R1}$ | $V_{dd}-V_{R1}$ | $V_{dd}-V_{R1}$ | $V_{R4}$ | $V_{R4}$ |
| FET8 | $V_{th}$ | $V_{th0}$ | $V_{th0}$ | $V_{th0}$ | $V_{th0}$ | $V_{th0}$ | $V_{th0}$ | $V_{th0}$ | $V_{th0}$ |
| | $V_{in}$ | $V_{dd}-V_{R2}$ | 0 | 0 | 0 | 0 | 0 | $V_{dd}-V_{R2}$ | 0 |
| FET9 | $V_{th}$ | $V_{th2}$ | $V_{th0}$ | $V_{th2}$ | $V_{th0}$ | $V_{th2}$ | $V_{th0}$ | $V_{th2}$ | $V_{th0}$ |
| | $V_{in}$ | $V_{R4}$ | $V_{R4}$ | $V_{dd}-V_{R1}$ | $V_{dd}-V_{R1}$ | $V_{dd}-V_{R1}$ | $V_{dd}-V_{R1}$ | $V_{R4}$ | $V_{R4}$ |
| Input | A | 0 | 0 | 0 | 0 | 1 | 1 | 1 | 1 |
| | B | 0 | 0 | 1 | 1 | 0 | 0 | 1 | 1 |
| | $C_i$ | 0 | 1 | 0 | 1 | 0 | 1 | 0 | 1 |
| Output | S' | 0 | 0 | 1 | 1 | 1 | 1 | 0 | 0 |
| | S | 0 | 1 | 1 | 0 | 1 | 0 | 0 | 1 |
| | $C_O$ | 0 | 0 | 0 | 1 | 0 | 1 | 1 | 1 |

In the table, $V_{dd}>V_{th2}>V_{in2}>V_{th0}>V_{in1}>V_{R4}>V_{th1}>0$, where $V_{th2}>V_{dd}-V_{R1}$ (or $V_{dd}-V_{R2})>V_{in2}$.

(1) When the first addend signal A=0, the threshold voltages of FET1, FET2 and FET5 are modulated to $V_{th0}$, and the threshold voltages of FET3 and FET6 are modulated to $V_{th2}$.

(a) When the second addend signal B=0, the gate voltage inputs of FET1, FET3, FET5 and FET6 are $V_{in1}$; since the threshold voltage $V_{th0}$ in FET1 and FET5 is greater than the gate voltage $V_{in1}$, the transistors of FET1 and FET5 are turned off, and their logic output is 0 (that is, A+B=0); since FET1 is turned off, the gate voltage input of FET2 is $V_{dd}-V_{R1}$, which is greater than the threshold voltage $V_{th0}$, FET2 is turned on, and its logic output is $\overline{A+B}=1$; since the threshold voltage $V_{th2}$ in FET3 and FET6 is greater than the gate voltage $V_{in1}$, the transistors of FET3 and FET6 are turned off, and their logic output is 0 (that is, AB=0); from this, it can be obtained that the half sum $S'=\overline{(A+B)+AB}=\overline{(0)+0}=\overline{1+0}=0$.

(i) When the low-order carry signal $C_i=0$, the threshold voltages of FET4 and FET9 are modulated to $V_{th2}$, the threshold voltages of FET7 and FET8 are modulated to $V_{th0}$, and the gate voltage input of FET4 is $V_{in1}$; since the threshold voltage $V_{th2}$ of the FET4 is greater than the gate voltage $V_{in1}$, the FET4 is turned off and its logic output is 0 (i.e. $C_i=0$); since FET4, FET5 and FET6 are turned off, the output of the high-order carry signal $C_O$ is a low-level voltage, and its logic output is 0, that is $C_O=(A+B)C_i+AB=0+0=0$; since the FET2 is turned on, the gate voltage input of the FET7 is the same as the voltage $V_{R4}$ across the small resistor R4, and since the gate voltage $V_{R4}$ of the FET7 is less than the threshold voltage $V_{th0}$, the FET7 is turned off, and its logic output is 0, that is $S'+C_i=0+0=0$; since the FET7 is turned off, the gate voltage input of the FET8 is $V_{dd}-V_{R2}$, which is greater than the threshold voltage $V_{th0}$, the FET8 is turned on, and its logic output is 1, i.e. $\overline{S'+C_i}=\overline{0}=1$; the gate voltage input of FET9 and FET7 is the same, that is $V_{R4}$, which is less than the threshold voltage $V_{th2}$, therefore FET9 is turned off, and its logic output is 0, i.e. $S'C_i=0$; from this, it can be obtained that the full sum $S=\overline{(S'+C_i)+S'C_i}=\overline{1+0}=0$.

(ii) When the low-order carry signal $C_i=1$, the threshold voltages of FET4 and FET7 are modulated to $V_{th1}$, the threshold voltages of FET8 and FET9 are modulated to $V_{th0}$, and the gate voltage input of FET4 is $V_{in1}$; since the threshold voltage $V_{th1}$ of the FET4 is less than the gate voltage $V_{in1}$, the FET4 is turned on and its logic output is 1 (i.e. $C_i=1$); since FET4 is turned on, FET5 and FET6 are turned off, and the output of the high-order carry signal $C_O$ is a low-level voltage, and its logic output is 0, that is $C_O=(A+B)C_i+AB=0+0=0$; since the FET2 is turned on, the gate voltage input of the FET7 is the same as the voltage $V_{R4}$ across the small resistor R4, and since the gate voltage $V_{R4}$ of the FET7 is greater than the threshold voltage $V_{th1}$, the FET7 is turned on, and its logic output is 1, that is $S'+C_i=0+1=1$; since the FET7 is turned on and the source end of the FET7 is grounded, the gate voltage input of the FET8 is 0 and less than the threshold voltage $V_{th0}$, the FET8 is turned off and its logic output is 0, that is, $\overline{S'+C_i}=\overline{0+1}=0$; the gate voltage inputs of FET9 and FET7 are the same, i.e. $V_{R4}$, which is less than the threshold voltage $V_{th0}$, therefore FET9 is turned off and its logic output is 0, that is, $S'C_i=0$; from this, it can be obtained that the full sum $S=\overline{(S'+C_i)+S'C_i}=\overline{(0+1)+0}=1$.

(b) When the second addend signal B=1, the gate voltage inputs of FET1, FET3, FET5 and FET6 are $V_{in2}$; since the threshold voltage $V_{th0}$ in FET1 and FET5 is less than the gate voltage $V_{in2}$, the transistors of FET1 and FET5 are turned on, and their logic output is 1 (that is, A+B=0+1=1); since FET1 is turned on and the source end of FET1 is grounded, the gate voltage input of FET2 is 0 less than the threshold voltage $V_{th0}$, FET2 is turned off, and its logic output is $\overline{A+B}=\overline{0+1}=0$; since the threshold voltage $V_{th2}$ in FET3 and FET6 is greater than the gate voltage $V_{in2}$, the transistors of FET3 and FET6 are turned off, and their logic output is 0 (that is, AB=0); from this, it can be obtained that the half sum $S'=\overline{(A+B)+AB}=\overline{(1)+0}=\overline{0+0}=1$.

(i) When the low-order carry signal $C_i=0$, the threshold voltages of FET4 and FET9 are modulated to $V_{th2}$, the threshold voltages of FET7 and FET8 are modulated to $V_{th0}$, and the gate voltage input of FET4 is $V_{in1}$; since the threshold voltage $V_{th2}$ of the FET4 is greater than the gate voltage $V_{in1}$, the FET4 is turned off and its logic output is 0 (i.e. $C_i=0$); since FET4 and FET6 are turned off, FET5 is turned on, and the output of the high-order carry signal $C_O$ is a low-level voltage, and its logic output is 0, that is $C_O=(A+B)C_i+AB=0+0=0$; since FET2 and FET3 are turned off, the gate voltage input of FET7 is $V_{dd}-V_{R1}$ which is greater than the threshold voltage $V_{th0}$, FET7 is turned on, and its logic output is 1, that is $S'+C_i=1+0=1$; since the FET7 is turned on and the source end of the FET7 is grounded, the gate voltage input of the FET8 is 0 and less than the threshold voltage $V_{th0}$, the FET8 is turned off and its logic output is 0, that is, $\overline{S'+C_i}=\overline{1+0}=0$; the gate voltage inputs of FET9 and FET7 are the same, that is, $V_{dd}-V_{R1}$, which is less than the threshold voltage $V_{th2}$, therefore FET9 is turned off and its logic output is 0, that is, $S'C_i=0$; from this, it can be obtained that the full sum $S=\overline{(S'+C_i)+S'C_i}=\overline{0+0}=1$.

(ii) When the low-order carry signal $C_i=1$, the threshold voltages of FET4 and FET7 are modulated to $V_{th1}$, the threshold voltages of FET8 and FET9 are modulated to $V_{th0}$, and the gate voltage input of FET4 is $V_{in1}$; since the threshold voltage $V_{th1}$ of the FET4 is less than the gate voltage $V_{in1}$, the FET4 is turned on and its logic output is 1 (i.e. $C_i=1$); since FET4 and FET5 are turned on, FET6 is turned off, and the output of the high-order carry signal $C_O$ is a high level voltage, $C_O=(A+B)C_i+AB=1+1=1$; since FET2 and FET3 are turned off, the gate voltage input of FET7 is $V_{dd}-V_{R1}$ which is greater than the threshold voltage $V_{th1}$, FET7 is turned on, and its logic output is 1, that is $S'+C_i=1+1=1$; since the FET7 is turned on and the source end of the FET7 is grounded, the gate voltage input of the FET8 is 0 and less than the threshold voltage $V_{th0}$, the FET8 is turned off and its logic output is 0, that is, $\overline{S'+C_i}=\overline{1+1}=0$; the gate voltage inputs of FET9 and FET7 are the same, that is, $V_{dd}-V_{R1}$, which is greater than the threshold voltage $V_{th0}$, therefore FET9 is turned on, and its logic output is 1, that is, $S'C_i=1$; from this, it can be obtained that the full sum $S=\overline{(S'+C_i)+S'C_i}=\overline{(1+1)+1}=0$.

(2) When the first addend signal A=1, the threshold voltages of FET1 and FET5 are modulated to $V_{th1}$, and the threshold voltages of FET2, FET3 and FET6 are modulated to $V_{th0}$.

(a) When the second addend signal B=0, the gate voltage inputs of FET1, FET3, FET5 and FET6 are $V_{in1}$; since the threshold voltage $V_{th1}$ of FET1 and FET5 is less than the gate voltage $V_{in1}$, FET1 and FET5 are turned on, and their logic output is 1, that is, A+B=1+0=1; since FET1 is turned on and the source of FET1 is grounded, the gate voltage input of FET2 is 0 less than the threshold voltage $V_{th0}$, FET2 is turned off, and its logic output is $\overline{A+B}=\overline{1+0}=0$; since the threshold voltage $V_{th0}$ in FET3 and FET6 is greater than the gate voltage $V_{in1}$, the transistors of FET3 and FET6 are turned off, and their logic output is 0 (that is, AB=0); from this, it can be obtained that the half sum $S'=\overline{(A+B)+AB}=\overline{(1)+0}=\overline{0+0}=1$.

(i) When the low-order carry signal $C_i=0$, the threshold voltages of FET4 and FET9 are modulated to $V_{th2}$, the threshold voltages of FET7 and FET8 are modulated to $V_{th0}$, and the gate voltage input of FET4 is $V_{in1}$; since the threshold voltage $V_{th2}$ of the FET4 is greater than the gate voltage $V_{in1}$, the FET4 is turned off and its logic output is 0 (i.e. $C_i=0$); since FET4 and FET6 are turned off, FET5 is turned on, and the output of the high-order carry signal $C_O$ is a low-level voltage, and its logic output is 0, that is $C_O=(A+B)C_i+AB=0+0=0$; since FET2 and FET3 are turned off, the gate voltage input of FET7 is $V_{dd}-V_{R1}$ which is greater than the threshold voltage $V_{th0}$, FET7 is turned on, and its logic output is 1, that is $S'+C_i=1+0=1$; since the FET7 is turned on and the source end of the FET7 is grounded, the gate voltage input of the FET8 is 0 and less than the threshold voltage $V_{th0}$, the FET8 is turned off and its logic output is 0, that is, $\overline{S'+C_i}=\overline{1+0}=0$; the gate voltage inputs of FET9 and FET7 are the same, that is, $V_{dd}-V_{R1}$, which is less than the threshold voltage $V_{th2}$, therefore FET9 is turned off and its logic output is 0, that is, $S'C_i=0$; from this, it can be obtained that the full sum $S=\overline{(S'+C_i)+S'C_i}=\overline{0+0}=1$.

(ii) When the low-order carry signal $C_i=1$, the threshold voltages of FET4 and FET7 are modulated to $V_{th1}$, the threshold voltages of FET8 and FET9 are modulated to $V_{th0}$, and the gate voltage input of FET4 is $V_{in1}$; since the threshold voltage $V_{th1}$ of the FET4 is less than the gate voltage $V_{in1}$, the FET4 is turned on and its logic output is 1 (i.e. $C_i=1$); since FET4 and FET5 are turned on, FET6 is turned off, and the output of the high-order carry signal $C_O$ is a high level voltage, $C_O=(A+B)C_i+AB=1+1=1$; since FET2 and FET3 are turned off, the gate voltage input of FET7 is $V_{dd}-V_{R1}$ which is greater than the threshold voltage $V_{th1}$, FET7 is turned on, and its logic output is 1, that is $S'+C_i=1+1=1$; since the FET7 is turned on and the source end of the FET7 is grounded, the gate voltage input of the FET8 is 0 and less than the threshold voltage $V_{th0}$, the FET8 is turned off and its logic output is 0, that is, $\overline{S'+C_i}=\overline{1+1}=0$; the gate voltage inputs of FET9 and FET7 are the same, that is, $V_{dd}-V_{R1}$, which is greater than the threshold voltage $V_{th0}$, therefore FET9 is turned on, and its logic output is 1, that is, $S'C_i=1$; from this, it can be obtained that the full sum $S=\overline{(S'+C_i)+S'C_i}=\overline{(1+1)+1}=0$.

(b) When the second addend signal B=1, the gate voltage inputs of FET1, FET3, FET5 and FET6 are $V_{in2}$; since the threshold voltage $V_{th1}$ of FET1 and FET5 is less than the gate voltage $V_{in2}$, FET1 and FET5 are turned on, and their logic output is 1, that is, A+B=1+1=1; the threshold voltage $V_{th0}$ of FET3 and FET6 is less than the gate voltage $V_{in2}$, therefore both FET3 and FET6 are turned on, and their logic output is 1, that is, AB=1; since FET1 is turned on and the source end of FET1 is grounded, the gate voltage input of FET2 is 0, which is less than the threshold voltage $V_{th0}$, FET2 is turned off, and its logic output is $\overline{A+B}=\overline{1+1}=0$; from this, it can be obtained that the half sum $S'=\overline{(A+B)+AB}=\overline{(1)+1}=\overline{0+1}=0$.

(i) When the low-order carry signal $C_i=0$, the threshold voltages of FET4 and FET9 are modulated to $V_{th2}$, the threshold voltages of FET7 and FET8 are modulated to $V_{th0}$, and the gate voltage input of FET4 is $V_{in1}$; since the threshold voltage $V_{th2}$ of the FET4 is greater than the gate voltage $V_{in1}$, the FET4 is turned off and its logic output is 0 (i.e. $C_i=0$); since FET4 is turned off, FET5 and FET6 are turned on, and the output of the high-order carry signal $C_O$ is a high level voltage, $C_O=(A+B)C_i+AB=0+1=1$; since the FET3 is turned on, the gate voltage input of the FET7 is the same as the voltage $V_{R4}$ across the small resistor R4, and the gate voltage $V_{R4}$ of the FET7 is less than the threshold voltage $V_{th0}$, the FET7 is turned off, and its logic output is 0, that is $S'+C_i=0+0=$; since the FET7 is turned off, the gate voltage input of the FET8 is $V_{dd}-V_{R2}$, which is greater than the threshold voltage $V_{th0}$, the FET8 is turned on, and its logic output is 1, i.e. $\overline{S'+C_i}=\overline{0}=1$; the gate voltage input of FET9 and FET7 is the same, that is $V_{R4}$, which is less than the threshold voltage $V_{th2}$, therefore, FET9 is turned off, and its logic output is 0, that is, $S'C_i=0$; from this, it can be obtained that the full sum $S=\overline{(S'+C_i)+S'C_i}=\overline{1+0}=0$.

(ii) When the low-order carry signal $C_i=1$, the threshold voltages of FET4 and FET7 are modulated to $V_{th1}$, the threshold voltages of FET8 and FET9 are modulated to $V_{th0}$, and the gate voltage input of FET4 is $V_{in1}$; since the threshold voltage $V_{th1}$ of the FET4 is less than the gate voltage $V_{in1}$, the FET4 is turned on and its logic output is 1 (i.e. $C_i=1$); since FET4, FET5 and FET6 are turned on, the output of the high-order carry signal is a high level voltage, $C_O=(A+B)C_i+AB=1+1=1$; since the FET3 is turned on, the gate voltage input of the FET7 is the same as the voltage $V_{R4}$ across the small resistor R4, and the gate voltage $V_{R4}$ of the FET7 is greater than the threshold voltage $V_{th1}$, the FET7 is turned on, and its logic output is 1, that is $S'+C_i=0+1=1$; since the FET7 is turned on and the source end of the FET7 is grounded, the gate voltage input of the FET8 is 0 and less than the threshold voltage $V_{th0}$, the FET8 is turned off and its logic output is 0, that is, $\overline{S'+C_i}=\overline{0+1}=0$; the gate voltage input of FET9 and FET7 is the same, that is $V_{R4}$, which is less than the threshold voltage $V_{th0}$, FET9 is turned off and its logic output is 0, that is, $S'C_i=0$; from this, it can be obtained that the full sum $S=\overline{(S'+C_i)+S'C_i}=\overline{(0+1)+0}=1$.

Based on the above analysis:

(1) When a first addend signal A=0, a second addend signal B=0 and a low-order carry signal $C_i=0$ are input, a half sum S'=0, a sum S=0, and a high-order carry signal $C_O=0$ are output.

(2) When a first addend signal A=0, a second addend signal B=0 and a low-order carry signal $C_i=1$ are input, a half sum S'=0, a sum S=1, and a high-order carry signal $C_O=0$ are output.

(3) When a first addend signal A=0, a second addend signal B=1 and a low-order carry signal $C_i=0$ are input, a half sum S'=1, a sum S=1, and a high-order carry signal $C_O=0$ are output.

(4) When a first addend signal A=0, a second addend signal B=1 and a low-order carry signal $C_i=1$ are input, a half sum S'=1, a sum S=0, and a high-order carry signal $C_O=1$ are output.

(5) When a first addend signal A=1, a second addend signal B=0 and a low-order carry signal $C_i=0$ are input, a half sum S'=1, a sum S=1, and a high-order carry signal $C_O=0$ are output.

(6) When a first addend signal A=1, a second addend signal B=0 and a low-order carry signal $C_i=1$ are input, a half sum S'=1, a sum S=0, and a high-order carry signal $C_O=1$ are output.

(7) When a first addend signal A=1, a second addend signal B=1 and a low-order carry signal $C_i=0$ are input, a half sum S'=0, a sum S=0, and a high-order carry signal $C_O=1$ are output.

(8) When a first addend signal A=1, a second addend signal B=1 and a low-order carry signal $C_i=1$ are input, a half sum S'=0, a sum S=1, and a high-order carry signal $C_O=1$ are output.

The above embodiments show that the present application has achieved the design of low-area full adder circuit based on nonvolatile in-memory computing field-effect transistors, and compared with the number of 28 transistors in static CMOS full adder circuit, this circuit area has been significantly optimized.

The present application also provides a multi-bit full adder, which is formed by cascading several low-area full adder circuits based on the nonvolatile in-memory computing field-effect transistors. The carry output end of the two or more lower-bit full adders based on the nonvolatile in-memory computing field-effect transistors is connected to the carry input end of the two or more higher-bit full adders based on the nonvolatile in-memory computing field-effect transistors.

The above-mentioned embodiments are only used to verify the present application, and are not used as limitations of the present application. As long as they are within the scope of the present application, changes and modifications made to the above-mentioned embodiments shall fall within the protection scope of the present application.

What is claimed is:

1. A low-area full adder circuit based on nonvolatile in-memory computing field-effect transistors, comprising:
    a sum generating circuit comprising six in-memory computing field-effect transistors, wherein the sum generating circuit is configured to receive a first input signal, a second input signal and a third input signal, and output a first output signal; and
    a carry generating circuit coupled to the sum generating circuit and comprising three in-memory computing field-effect transistors, wherein the carry generating circuit is configured to receive the first input signal and the second input signal from the sum generating circuit, receive the third input signal, and output a second output signal;
    wherein the first output signal is a result of a summation logic operation of the first input signal, the second input signal and the third input signal, and the second output signal is a result of a carry logic operation of the first input signal, the second input signal and the third input signal;
    and wherein the sum generating circuit comprises:
    a first in-memory computing field-effect transistor, a threshold voltage of the first in-memory computing field-effect transistor is configured to receive the first input signal, and a gate voltage of the first in-memory computing field-effect transistor is configured to receive the second input signal;
    a first parallel structure comprising a second in-memory computing field-effect transistor and a third in-memory computing field-effect transistor, wherein a threshold voltage of the second in-memory computing field-effect transistor is a constant value, and a gate input signal of the second in-memory computing field-effect transistor is a drain output signal of the first in-memory computing field-effect transistor; wherein a threshold voltage of the third in-memory computing field-effect transistor is configured to receive the first input signal, and a gate voltage of the third in-memory computing field-effect transistor is configured to receive the second input signal;
    a seventh in-memory computing field-effect transistor, a threshold voltage of the seventh in-memory computing field-effect transistor is configured to receive the third input signal, and a gate input signal of the seventh in-memory computing field-effect transistor is a drain output signal of the first parallel structure; and
    a second parallel structure comprising an eighth in-memory computing field-effect transistor and a ninth in-memory computing field-effect transistor, wherein a threshold voltage of the eighth in-memory computing field-effect transistor is a constant value, and a gate input signal of the eighth in-memory computing field-effect transistor is a drain output signal of the seventh in-memory computing field-effect transistor; wherein a threshold voltage of the ninth in-memory computing field-effect transistor is configured to receive the third input signal, a gate input signal of the ninth in-memory computing field-effect transistor is the same as the gate input signal of the seventh in-memory computing field-effect transistor, and a drain output signal of the second parallel structure is the first output signal.

2. The low-area full adder circuit based nonvolatile in-memory computing field-effect transistors according to claim 1, wherein the sum generating circuit comprises:
    the first in-memory computing field-effect transistor, a source terminal of the first in-memory computing field-effect transistor is grounded, and a drain terminal of the first in-memory computing field-effect transistor is connected to a pull-up resistor;
    the first parallel structure comprising the second in-memory computing field-effect transistor and the third in-memory computing field-effect transistor, wherein a drain terminal of the first parallel structure is connected to the pull-up resistor, a source terminal of the first parallel structure is connected to a small resistor, and the other end of the small resistor is grounded; a gate terminal of the second in-memory computing field-effect transistor is connected to the drain terminal of the first in-memory computing field-effect transistor;
    the seventh in-memory computing field-effect transistor, a source terminal of the seventh in-memory computing field-effect transistor is grounded, a drain terminal of the seventh in-memory computing field-effect transistor is connected to the pull-up resistor, and a gate terminal of the seventh in-memory computing field-effect transistor is connected to the drain terminal of the first parallel structure; and
    the second parallel structure comprising the eighth in-memory computing field-effect transistor and the ninth in-memory computing field-effect transistor, wherein a drain terminal of the second parallel structure is connected to the pull-up resistor, and a source terminal of the second parallel structure is grounded; a gate terminal of the eighth in-memory computing field-effect transistor is connected to the drain terminal of the seventh in-memory computing field-effect transistor.

3. A low-area full adder circuit based on nonvolatile in-memory computing field-effect transistors, comprising:
    a sum generating circuit comprising six in-memory computing field-effect transistors, wherein the sum generating circuit is configured to receive a first input signal, a second input signal and a third input signal, and output a first output signal; and
    a carry generating circuit coupled to the sum generating circuit and comprising three in-memory computing field-effect transistors, wherein the carry generating circuit is configured to receive the first input signal and the second input signal from the sum generating circuit, receive the third input signal, and output a second output signal;

wherein the first output signal is a result of a summation logic operation of the first input signal, the second input signal and the third input signal, and the second output signal is a result of a carry logic operation of the first input signal, the second input signal and the third input signal;

wherein the carry generating circuit comprises:

a third parallel structure comprising a fourth in-memory computing field-effect transistor, a fifth in-memory computing field-effect transistor and a sixth in-memory computing field-effect transistor, wherein a threshold voltage of the fourth in-memory computing field-effect transistor is configured to receive the third input signal, and a gate input signal of the fourth in-memory computing field-effect transistor is a constant value;

wherein a threshold voltage of the fifth in-memory computing field-effect transistor is configured to receive the first input signal, and a gate voltage of the fifth in-memory computing field-effect transistor is configured to receive the second input signal;

wherein a threshold voltage of the sixth in-memory computing field-effect transistor is configured to receive the first input signal, and a gate voltage of the sixth in-memory computing field-effect transistor is configured to receive the second input signal; and wherein a source output signal of the third parallel structure is the second output signal.

4. The low-area full adder circuit based on nonvolatile in-memory computing field-effect transistors according to claim 3, wherein the carry generating circuit comprises:

the third parallel structure comprising the fourth in-memory computing field-effect transistor, the fifth in-memory computing field-effect transistor and the sixth in-memory computing field-effect transistor, wherein a source terminal of the fourth in-memory computing field-effect transistor is connected to a drain terminal of the fifth in-memory computing field-effect transistor to form a first series structure, wherein a drain terminal of the fourth in-memory computing field-effect transistor is connected to a drain terminal of the sixth in-memory computing field-effect transistor, and a source terminal of the fifth in-memory computing field-effect transistor is connected to a source terminal of the sixth in-memory computing field-effect transistor, in such a manner that the first series structure is connected in parallel with the sixth in-memory computing field-effect transistor;

wherein a gate terminal of the fifth in-memory computing field-effect transistor is connected to a gate terminal of a first in-memory computing field-effect transistor of the sum generating circuit, and a gate terminal of the sixth in-memory computing field-effect transistor is connected to a gate terminal of a third in-memory computing field-effect transistor of the sum generating circuit; and wherein a source terminal of the third parallel structure is connected to a pull-down resistor, and a drain terminal of the third parallel structure is connected to a supply voltage $V_{dd}$.

* * * * *